June 27, 1944. H. V. ENGH 2,352,426
MANUFACTURE OF INSULATED WIRE
Filed Jan. 29, 1942
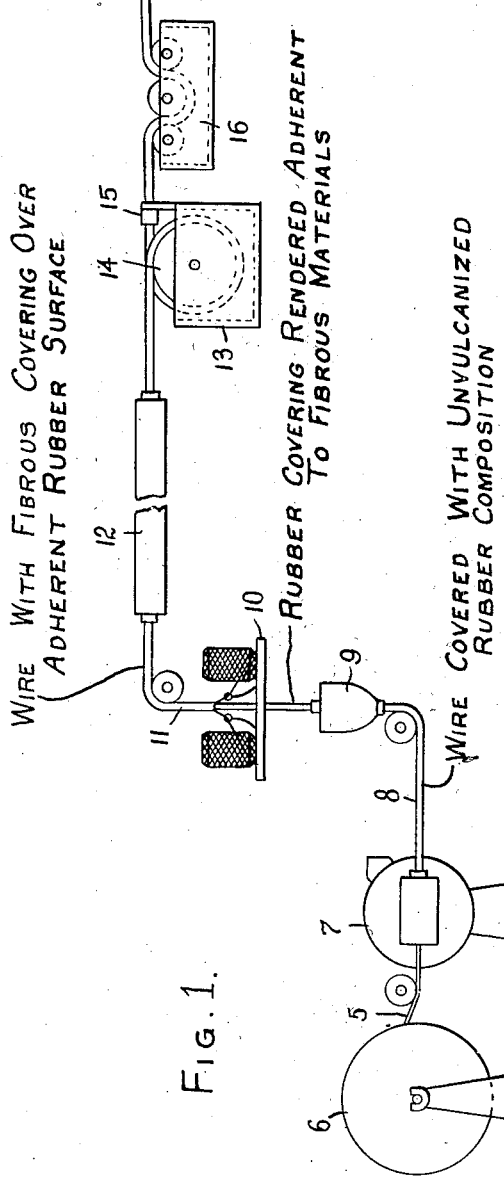
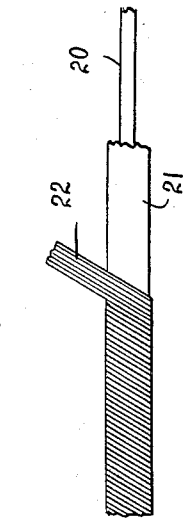
INVENTOR
HAROLD V. ENGH
BY
ATTORNEYS Patented June 27, 1944

2,352,426

UNITED STATES PATENT OFFICE 2,352,426

MANUFACTURE OF INSULATED WIRE

Harold V. Engh, Irvington, N. Y., assignor to Anaconda Wire and Cable Company, a corporation of Delaware Application January 29, 1942, Serial No. 428,727

8 Claims. (Cl. 57—162)

This invention relates to the manufacture of insulated wire, and has for its principal object the production of an improved rubber-insulated wire of the type commonly known as building wire. The invention, however, is not limited specifically to the manufacture of building wire, but may be used with advantage in the manufacture of other types of wire.

Rubber is a good electrical insulator, and has long been used as an insulating material for wires. However, rubber is subject to deterioration upon prolonged exposure to moisture, such as occurs when it is exposed to the weather, and is susceptible to mechanical injury. It has therefore been customary, in the manufacture of rubber-covered building wire and other similar wires, to apply a fibrous covering over the rubber to protect it from mechanical injury, and to impregnate this fibrous covering with various protective moisture-resistant, weather-resistant and flame-resistant compounds.

For many years it has been customary to apply the fabric covering in the form of a woven braid. Woven braids afford good mechanical protection for the rubber and a good base for the impregnating materials, but they must be woven in place about the wire, and such weaving is necessarily rather slow. It has been proposed to substitute a fibrous serving, consisting simply of a multiplicity of fibrous threads wound helically about the wire, for the woven braid. A serving can be applied more rapidly than a braid, because it is simply wound about the wire and does not have to be woven in place. However, a serving by itself is not effective protection for the wire, because when the wire is bent, the adjacent turns of the serving are caused to open, exposing the rubber and even causing some of the impregnating materials to crack or break from the wire. Expedients such as binder threads, wound over the serving with a pitch opposite to that of the serving, have been proposed to hold the serving in place on the wire, but such expedients are not wholly satisfactory.

It has also been proposed to apply the serving to the wire before the rubber insulation has been vulcanized, and to pass the wire through heated paraffin or through heated bituminous saturants for the purpose of saturating or impregnating the fibrous serving, and at the same time for causing it to adhere to the rubber. This proposal has not met with acceptance, however, because the application of the paraffin or saturating compound, before the serving has been caused to adhere to the rubber, results in a product which is not always of uniform quality. The paraffin or other saturating material sometimes penetrates beneath the serving (particularly if the serving is a little loose) forming a film between the fibrous serving and the rubber and preventing wholly satisfactory adhesion of the serving to the rubber. Moreover, application of a hot saturating compound to the served wire before vulcanization of the rubber in some cases results in deterioration of the surface portion of the rubber, so that it may not vulcanize properly, or so that its mechanical and insulating properties may be impaired.

The present invention provides an improved method for manufacturing insulated wire which comprises applying a layer of a vulcanizable rubber composition to a conductor element, and then applying over the rubber composition a material capable of making the surface portion thereof adhesive to fibrous material. A covering of fibrous material (advantageously a somewhat fuzzy fibrous material such as cotton) is then applied to the rubber, and the resulting wire is then subjected to vulcanizing treatment, whereby the fibrous covering is caused to adhere firmly to the rubber.

The application to the vulcanizable rubber composition of a material making it adhesive to fibrous material, before the fibrous material is applied, results in effective adhesion of the fibrous material to the rubber, and at the same time leaves the fibrous material capable of being impregnated with the usual saturating and coating compounds. Wires thus produced may be bent sharply without causing the fibrous covering, even though it may be a simple serving, to separate even slightly from the rubber and so expose the rubber to the elements, and without causing superposed saturants or coating compositions to crack off.

Among the most satisfactory materials for application to the unvulcanized rubber, in order to make the rubber adequately adhesive to fibrous materials, may be mentioned latex (advantageously a vulcanizable latex preparation), rubber-bearing solutions, and solvents for rubber such as carbon disulphide, turpentine, benzene, chloroform, carbon tetrachloride, and the like.

Wires produced in accordance with the invention are characterized by having the surface portion of the rubber, in contact with the fibrous covering, strongly adherent to the fibrous covering uniformly along the length and about the circumference of the wire. Although the rubber bonds directly to the fibrous covering, it does not penetrate very far into this covering, and so does not interfere with effective impregnation thereof by the usual moisture-resistant compounds.

The invention will be better understood from the following specific description of the manufacture of a rubber covered building wire, presented in conjunction with the accompanying drawing, in which Fig. 1 is a schematic diagram of an arrangement of apparatus suitable for manufacturing wire in accordance with the invention; and Fig. 2 is a view of a wire made in accordance with the invention.

A specific example of the manufacture of rubber-covered building wire in accordance with the invention is diagrammatically illustrated in Fig. 1 of the drawing. A copper wire or other conductor 5 is drawn from a reel 6 through a standard tubing machine 7 for forming a rubber covering thereon. In the case of a building wire, the conductor 5 is generally a single solid copper wire which may or may not be tinned. However, the invention is not limited to this particular form of conductor. It may, for example, be a conductor element composed of a plurality of wires stranded together and to which a rubber covering may be applied, or it may be two or more individually insulated conductors which are to be encased in a single jacket to form a multi-conductor cable.

In the tubing machine 7 a layer of unvulcanized rubber is formed about the conductor element (or elements) and the wire 8 emerging from the tubing machine is composed of the copper or other conductor covered with a layer of unvulcanized rubber.

Although particular mention is made in this specific description of the invention of a rubber covering for the wire, it is understood that the term "rubber" is not limited to natural rubber. Natural rubber generally is used as the covering for common building wire, but the term "rubber" as used herein includes the many different synthetic rubbers and rubber-like compositions suitable for insulating wires.

A material capable of rendering the surface of the unvulcanized rubber adhesive to fibrous materials is next applied to the rubber-covered wire 8. To this end, the wire 8 may be drawn through a vessel 9 containing a bath of a material suitable for this purpose. The material constituting the bath in the vessel 9 may, for example, be latex or a latex preparation, or it may be a solvent for rubber such as carbon disulphide, benzene, chloroform or acetone, or it may be a solution of rubber in a suitable solvent. If latex is employed, it is advantageously a latex preparation containing the necessary ingredients such as sulphur and an accelerator for enabling the latex film on the wire to be vulcanized. The latex may be natural latex prepared in any known manner so that it may be vulcanized after application to the wire, or it may be an artificially prepared dispersion of natural rubber, or it may be a dispersion of a synthetic rubber in water or other suitable vehicle. The preparation of such latex or latex-like compositions are well known in the art.

If a solvent for rubber is employed in the vessel 9, it may be used in the substantially pure commercial state. Any of the conventional rubber solvents, such as carbon disulphide, turpentine, benzene, chloroform, carbon tetrachloride, known specially prepared solvents, etc., capable of softening the surface portion of the rubber layer and thereby rendering it adhesive to fibrous material may be employed. Generally it is advantageous to employ a solvent that does not evaporate very rapidly, as the solvent should remain as a film wetting the surface of the wire until after the serving has been applied. Turpentine and the less volatile hydrocarbon solvents are of value for this reason.

If a rubber-bearing solution is used, it may be any solution of rubber, either natural or synthetic, in a solvent therefor, such as one of the solvents mentioned above. The preparation of such solutions is well-known in the art.

The vessel 9 may be constructed so that it is closed at the top to confine the vapors of the rubber solvent or to prevent evaporation of the liquid phase of the latex or other similar preparation. A suitable cover is especially desirable if a volatile organic solvent for rubber is employed so as to reduce evaporation losses of such a solvent, and also to prevent the escape of fumes which might, if unconfined, be hazardous. To this end glands may be provided at the top and bottom of the vessel 9. The gland at the top of the vessel 9 may serve also as a wiper to remove excess of the latex or other material picked up by the wire in passing through the vessel. Means also may be provided to replenish the supply of material constituting the bath in the vessel 9.

The purpose of the latex or equivalent composition, the rubber solvent, or the rubber-bearing solution is to render the surface of the wire somewhat sticky and readily adhesive to a fibrous covering. The depth of the bath in the vessel 9 is therefore proportioned to the speed of the wire therethrough so as to secure an optimum sticky surface on the rubber-covered wire 8. If latex or a latex-like composition, or a rubber-bearing solution, is used in the vessel 9, the sticky rubber surface is provided by the latex or the solution itself, which in turn adheres readily to the underlying unvulcanized rubber. If a rubber solvent is employed in the vessel 9, it softens the surface of the unvulcanized rubber, rendering it more sticky than untreated unvulcanized rubber and strongly adhesive to fibrous materials. It is of course understood that the form of the vessel 9 shown in the drawing is but one specific embodiment of apparatus for applying the latex, rubber solvent or rubber-bearing solution to the wire, and that other forms of apparatus are known to the art and adaptable to use for this purpose.

The wire emerging from the vessel 9 next passes through a conventional serving machine 10 by means of which a helical serving of fibrous material is wound about the wire. The serving consists of a series of a number of threads arranged side by side and wound in a closed helix about the wire. Cotton is a particularly satisfactory serving material, as cotton threads are normally slightly fuzzy and for this reason bond well to the rubber. Other fibrous materials may, however, be employed. Serving machines are well known in the art, and a standard type of serving machine may be employed. The rubber covering on the wire should be sufficiently wet with the latex preparation, solvent, rubber solution, or the like, at the moment the serving is applied so as to be adhesive to the threads of the serving.

Although it is advantageous, in the production of ordinary building wires, to apply the fibrous material as a serving, it is of course understood that the fibrous covering may be in the form of a helically wound woven tape of fibrous material, or it may be a braid woven in place about the wire by a braiding machine. In most cases, however, a simple serving is most advantageous because it can be applied most rapidly and with maximum economy of materials. In the case of wire made in accordance with the invention, it provides effective mechanical protection for the underlying rubber and a good base for subsequently applied moisture-resistant or equivalent compounds.

On account of the sticky nature of the surface of the wire as it enters the serving machine 10, the applied fibrous covering is caused to adhere firmly to the rubber. The sticky surface layer of the rubber covering becomes bonded directly to that portion of the fibrous covering immediately adjacent the rubber. In the case of a wire properly prepared in accordance with the invention, however, the rubber does not penetrate very much into the fibrous material, but instead leaves the major portion thereof substantially dry, porous and absorbent so that it may receive and be impregnated by subsequently applied moisture-resistant saturating or other finishing compounds.

The served wire 11 emerging from the serving machine 10 next is treated to vulcanize the rubber and thereby to bring about final and complete adhesion of the fibrous covering to the underlying wire. Advantageously this is accomplished by passing the wire through a continuous wire vulcanizing apparatus 12, equipped with appropriate glands or other sealing devices at each end so that vulcanizing temperatures and pressures may be maintained about the wire. If desired, however, the wire 11 may be coiled or reeled as it emerges from the serving machine 10, and may be vulcanized in a batch vulcanizing operation. The presence of the fibrous covering on the wire prior to vulcanization facilitates to a considerable extent the handling of the wire as it effectively prevents contact of two unvulcanized rubber surfaces and the consequent tendency for such surfaces to stick together.

After vulcanization, the wire is passed through one or more tanks or other vessels 13 in which a heated fluid saturating compound is maintained. The saturating compound most commonly used is an asphaltic material which penetrates and impregnates the pores and interstices of the fibrous covering, rendering the covering moisture-resistant. The apparatus used for applying the saturating compound may be of the sort commonly employed in the industry. As shown, the wire is wound one or more times around a reel 14 which is partially immersed in the saturant contained in the vessel 13. The saturated wire passing from the reel 14 is drawn through a wiping die or wiping rag 15 to remove excess saturant. The saturated or impregnated wire next may be drawn through a vessel 16 containing cold water to cool the wire and to insure solidification of the saturant. Conventional apparatus may be used for this purpose.

Although the drawing shows only one saturating vessel 13 for applying a single saturating compound to the wire, it is understood that any number of such vessels for applying any number of suitable finishing compounds may be employed. For example, it has been common in the industry to apply first an asphaltic saturant for the purpose of rendering the wire moisture-resistant, then a pitchy flame-retarding compound to render the wire flame-resistant, and finally a thin film of waxy material over the pitch. The finished wire is wound on a reel 17.

A single conductor building wire made in accordance with the invention is illustrated, by way of example, in Fig. 2. It comprises a metallic conductor 20 encased in a layer of rubber insulation 21, with a fibrous covering in the form of a serving 22 wound about the rubber. The wire is particularly characterized by having the serving or other covering strongly adherent to the rubber uniformly along the length and about the circumference of the wire. The rubber is bonded directly to the fibrous covering immediately adjacent the rubber. The cotton threads usually employed for the serving are naturally somewhat fuzzy, and this fuzz, where it is in contact with the rubber, is particularly well bonded to the rubber and so contributes materially to the strength of the bond. The characteristic strong and uniform adhesion of the fibrous covering to the rubber is the direct result of having treated the wire, prior to application of the fibrous covering, to render the rubber surface sticky and adhesive to the fibrous material.

On account of the strong adhesion of the fibrous material to the rubber, the covering may be in the form of a simple serving which remains strongly adherent to the rubber even when the wire is sharply bent. There is consequently no tendency for the turns of the serving to open, exposing the rubber and causing chipping or cracking of the saturant or other finishing compounds upon bending the wire. For this reason, no binder threads or other adjunctive elements are necessary to hold the serving in place. A single serving generally affords ample mechanical protection for the rubber.

Inasmuch as the rubber surface is made sticky immediately before application of the fibrous covering, and not by a material applied after the serving has been wound on the wire, the absorptive capacity of the serving for the saturant and other compounds is not impaired, and its pores and interstices are not filled with any material intended to soften the rubber. It therefore provides a good base for any desired saturant or other finishing compounds. Moreover, the adhesion of the fibrous covering to the rubber is markedly greater than if the serving is applied before treating the unvulcanized rubber to soften it, as, for example, by drawing the wire, after application of the fibrous serving but without first rendering the surface of the rubber sticky, through a bath of heated paraffin, asphalt or other material. This stronger adhesion of the fibrous material, when applied in accordance with the invention, apparently is due to the fact that the rubber is caused to adhere directly to the fibrous material before any extraneously applied finishing compounds have been given an opportunity to saturate the pores and interstices of the fibrous covering, coating and smoothing down its fuzz, and even forming a thin, not strongly adhesive film between parts of the fibrous covering and the rubber.

Although the invention has been described above with particular reference to building wire, it is understood that any wire, either multiple or single conductor, which has a rubber covering and superposed covering of fibrous material may be made with advantage in accordance with the invention.

I claim:

1. The method of manufacturing an insulated wire which comprises applying to a conductor element a layer of a vulcanizable rubber composition, applying to said rubber composition a material capable of making the surface portion thereof adhesive to fibrous material, then applying a covering of fibrous material to the rubber, and then vulcanizing the rubber, said fibrous covering thereby being caused to adhere firmly to the rubber while the pores of said fibrous covering are maintained substantially completely open for the reception of an impregnating compound.

2. The method of manufacturing an insulated wire which comprises applying to a conductor element a layer of a vulcanizable rubber composition, applying to said rubber composition a substance selected from the group consisting of latex, rubber-bearing solutions and solvents for rubber, said substance being applied to the rubber in sufficient amount to cause fibrous material to adhere to the rubber, then applying a covering of fibrous material to the rubber, and then vulcanizing the rubber, said fibrous covering thereby being caused to adhere firmly to the rubber while the pores of said fibrous covering are maintained substantially completely open for the reception of an impregnating compound.

3. The method of manufacturing an insulated wire which comprises applying to a conductor element a layer of a vulcanizable rubber composition, applying to said rubber composition a material capable of making the surface portion thereof adhesive to fibrous material, then applying a serving of fibrous material to the rubber, then vulcanizing the rubber, the fibrous serving thereby being caused to adhere firmly to the rubber without becoming impregnated to any substantial extent with adhesive, and impregnating the fibrous serving with a bituminous material.

4. The method of manufacturing an insulated wire which comprises applying to a conductor element a layer of a vulcanizable rubber composition, applying to said rubber composition a substance selected from the group consisting of latex, rubber-bearing solutions and solvents for rubber, said substance being applied to the rubber in sufficient amount to cause fibrous material to adhere to the rubber, then applying a serving of fibrous material to the rubber, and then vulcanizing the rubber, said fibrous serving thereby being caused to adhere firmly to the rubber while the pores of said fibrous covering are maintained substantially completely open for the reception of an impregnating compound.

5. The method of manufacturing an insulated wire which comprises applying to a conductor strand a layer of a vulcanizable rubber composition, applying to said rubber composition a coating of vulcanizable latex, then applying a covering of fibrous material to the latex-coated wire, and then vulcanizing the rubber and latex, said fibrous covering thereby being caused to adhere firmly to the rubber without the pores thereof becoming impregnated with latex to any substantial extent.

6. The method of manufacturing an insulated wire which comprises applying to a conductor element a layer of a vulcanizable rubber composition, applying to said rubber composition a coating of vulcanizable latex, then applying a serving of fibrous material to the latex-coated wire, then vulcanizing the rubber and latex, the fibrous serving thereby being caused to adhere firmly to the rubber without becoming impregnated to any substantial extent with latex, and impregnating the fibrous serving with a bituminous material.

7. The method of manufacturing an insulated wire which comprises applying to a conductor element a layer of a vulcanizable rubber composition, applying to said rubber composition a film of a rubber solvent, then applying a covering of fibrous material to the solvent-treated wire, and then vulcanizing the rubber, said fibrous covering thereby being caused to adhere firmly to the rubber without the pores thereof becoming impregnated to any substantial extent with solvent or dissolved rubber.

8. The method of manufacturing an insulated wire which comprises applying to a conductor element a layer of a vulcanizable rubber composition, applying to said rubber composition a film of a rubber solvent, then applying a serving of fibrous material to the solvent-treated wire, then vulcanizing the rubber, the fibrous serving thereby being caused to adhere firmly to the rubber without the pores thereof becoming impregnated to any substantial extent with solvent or dissolved rubber, and impregnating the fibrous serving with a bituminous material.

HAROLD V. ENGH.